United States Statutory Invention Registration [19]

[11] Reg. Number: H68

France [45] Published: May 6, 1986

[54] ENVIRONMENTALLY ENERGIZED ARM-FIRE DEVICE ACTUATOR

[75] Inventor: John H. France, Ogden, Utah

[73] Assignee: The United States of America as represented by the Secretary of the Navy, Washington, D.C.

[21] Appl. No.: 767,469

[22] Filed: Aug. 16, 1985

[51] Int. Cl.[4] ..... F42C 5/00

[52] U.S. Cl. ..... 102/224

[56] References Cited

U.S. PATENT DOCUMENTS

| | | | |
|---|---|---|---|
| 2,466,729 | 4/1949 | Nelson et al. | 102/397 |
| 3,362,332 | 1/1968 | Campagnuolo | 102/224 |
| 3,710,716 | 1/1973 | Davis et al. | 102/397 |
| 3,792,664 | 2/1974 | Campagnuolo | 102/207 |
| 3,861,313 | 1/1975 | Campagnuolo | 102/207 |
| 3,865,143 | 2/1975 | Curto | 137/826 |

*Primary Examiner*—David H. Brown

*Attorney, Agent, or Firm*—Robert F. Beers; W. Thom Skeer; Stephen J. Church

[57] ABSTRACT

A fluid oscillator having a tube provided with a slit which is pivotable into a boundary layer of air flowing over a missile for arming and is pivotable from the missile exterior. The tube is configured so that the boundary layer excites oscillations within the tube at a predetermined velocity at which the missile is to arm.

10 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1
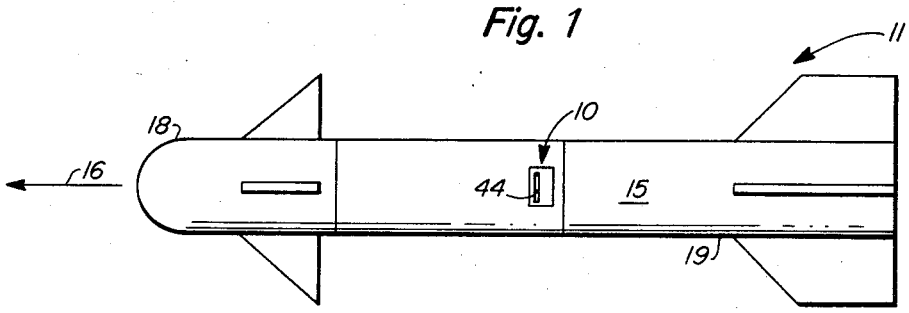
Fig. 3
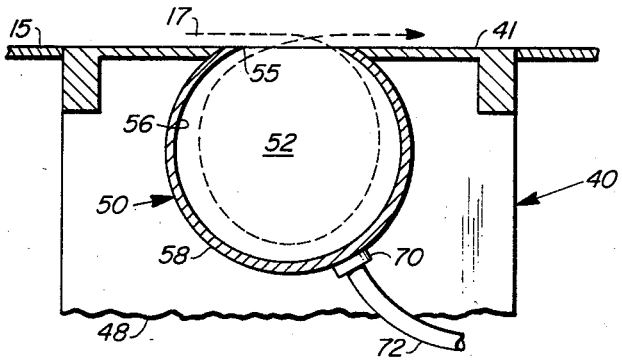
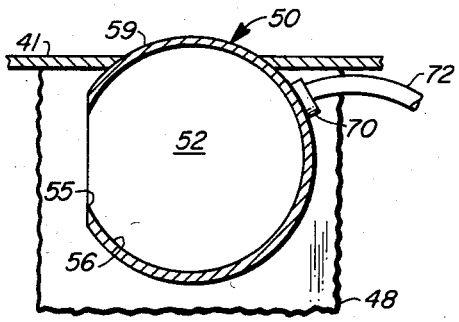
Fig. 4

ENVIRONMENTALLY ENERGIZED ARM-FIRE DEVICE ACTUATOR

BACKGROUND OF THE INVENTION

1. Field of the Invention

This invention pertains to the field of ammunition and explosives. More particularly it pertains to the field of arming devices incorporating a fluidic device.

2. Description of the Prior Art

It is well known to utilize fluidic oscillators to arm a weapon at a predetermined velocity thereof through the air, the oscillator being configured so as to be driven into oscillation by air flow at such velocity and an acousto-electrical of acousto-mechanical transducer being used to sense the oscillations. The use of fluidic oscillators or other devices sensing weapon velocity in this manner is advantageous in that the weapon not only does not arm until it attains such velocity but may be arranged to disarm when the velocity becomes less then such velocity, a feature particularly useful with an aircraft borne missile which should arm when the carrying aircraft is at flight speed and, preferably, should disarm automatically on landing if the aircraft returns with the missile unfired.

Insofar as known to the applicants, prior art fluid oscillators used for arming or disarming a weapon and driven by ram air require either an air inlet at the forward weapon end or a probe extended transversely of the weapon. Both of these arrangements present disadvantages with certain weapon configurations. One disadvantage is that such arrangements may not function properly at a high angle of attack. Another disadvantage is that a forward end inlet is inconvenient in a typical missile having its forward portion, devoted to guidance equipment and having an arming device located rearwardly in a warhead or a rocket motor which is directly controlled by the arming device and is usually stored separately from the guidance portion. Still another disadvantage is that transversely extended probes and elements of some forward inlets are commonly made retractable to save storage space and to avoid damage in handling. The arrangements required to provide for such retraction utilize space and weight which are at a premium in a missile.

SUMMARY OF THE INVENTION

The subject invention involves a cylindrical tube having a slit in one side and moveable between an operating position, in which the slit opens transversely of a missile or the like into a boundary layer of air flowing along the missile to excite oscillation in the tube, and an inactive position in which the slit is not open to the environment. The tube is configured so that such oscillations are not excited until the missile has a predetermined forward velocity corresponding to a point in a mission when it is safe to complete arming of the missile.

It is an object of the subject invention to provide an environmentally energized arm-fire device actuator providing a signal at a predetermined velocity of a weapon mounting the actuator.

Another object is to provide such an actuator having an opening which is conveniently and selectively closeable to prevent arming and to avoid blockage prior to velocity determination.

A further object is to provide such an actuator which has the above advantages and which is compact, light in weight, and fully effective in carrying out its intended purpose.

BRIEF DESCRIPTION OF THE DRAWINGS

Other objects, advantages, and novel features of the subject invention will become apparent from the following detailed description of the invention when considered with the accompanying drawings in which:

FIG. 1 is a side view of a missle mounting a fluid oscillator apparatus embodying the subject invention;

FIG. 3 is a section taken on line 3—3 of FIG. 2 showing a cylindrical tube of the apparatus in an operating position;

FIG. 4 is a section, similar to FIG. 3, showing the tube in an inactive position.

DESCRIPTION OF THE PREFERRED EMBODIMENT

Figure 2:
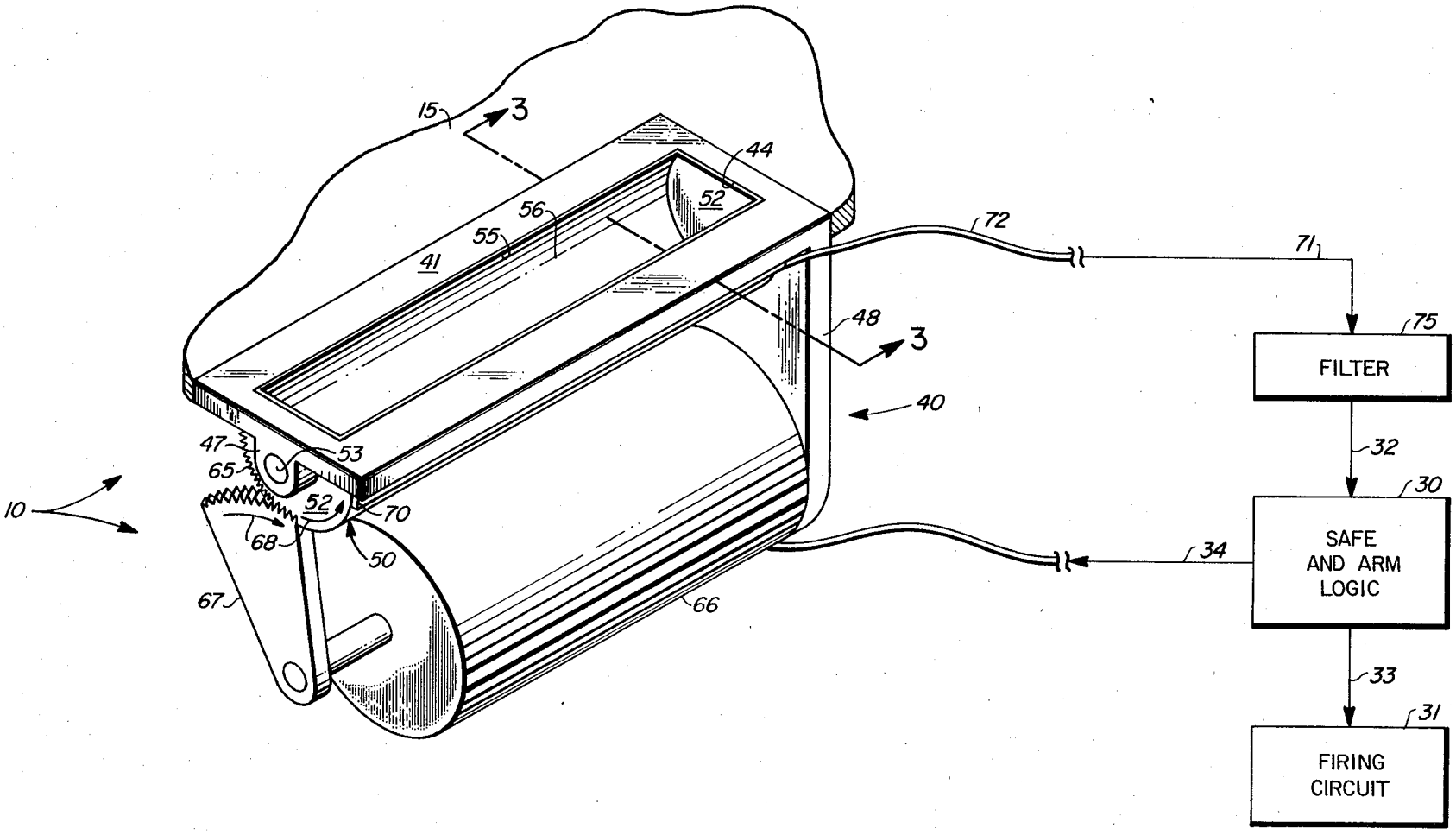
FIG. 2 is a perspective view of such apparatus and an adjacent region of the skin of the missile together with schematically represented circuits and devices associated with the apparatus.

In FIG. 1 a fluid oscillator apparatus 10 embodying the principles of the subject invention is depicted mounted in a missile 11 which is a representative operating environment for the apparatus. Missile 11 has an exterior skin 15 and is moveable through the air along a predetermined direction of movement 16 so as to induce air flow along skin 15 in a boundary layer indicated by arrow 17 in FIG. 3. Missile 11, which is elongated in direction 16, terminates forwardly in a guidance portion 18 and terminates rearwardly in a motor portion 19.

Missile 11 has an arm-fire or a safe and arm device mounted therein and schematically represented in FIG. 2 by safe and arm logic 30 and a firing circuit 31 of any suitable construction adapted to the function of missile 11 and to function with apparatus 10 as described in greater detail below. Logic 30 is receptive to an electrical signal 32 and, typically, outputs such a signal 33 to circuit 31 which, in turn, initiates operation of motor portion 19. Logic 30 also provides a signal 34 to apparatus 10, and this logic and the apparatus are, typically, disposed between missile portions 18 and 19 adjacent to the latter portion as shown in FIG. 1 for apparatus 10.

As best shown in FIGS. 2 and 3, apparatus 10 has a housing 40 mounted on missile 11 and bearing a peripheral surface 41 aligned with the exterior surface of skin 15 so that air from boundary layer 17 flows over surface 41. Housing 40 is of any suitable construction and may, of course, be unitarily constructed with the portion of skin 15 in the vicinity of apparatus 10. Housing 40 has a rectangular opening 44 through surface 41 with the longer dimension of the opening extending normally to air flowing in layer 17 and thus transversely of direction 16 and missile 11. Housing 40 is depicted in FIG. 2 as having a shorter lug 47 and a longer lug 48 disposed longitudinally oppositely of opening 44 and extending inwardly of missile 11 from surface 41.

Apparatus 10 has a cylindrical tube, indicated generally by numeral 50, mounted on housing 40 with the axis of the tube extended parallel to opening 44 and spaced from surface 41 substantially the radius of tube 50. The axis of tube 50 is thus disposed generally parallel to surface 41. Tube 50 is closed at its opposite axial ends by disks 52 which, typically, are integral with the circumferential portion of the tube. Each disk 52 bears a pivot 53 received in the adjacent lug 47 or 48 so that tube 50 is mounted on housing 40 for pivotal movement about the axis thereof, only the pivot 53 associated with lug 47 being shown in the drawings. It is evident that other arrangements than disks 52 and pivots 53 may be provided for closing the ends of a tube corresponding to tube 50 and for pivotally mounting such tube on a missile such as missile 11. One side of tube 50 is configured as if the tube were cut away along a plane corresponding to surface 41 so that tube 50 defines a slit 55, which opens from a cavity 56 defined within the tube. By pivoting tube 50, slit 55 may be disposed, as best shown in FIG. 3, so that the slit opens from cavity 56 through opening 44 and through skin 15 into boundary layer 17. It is evident that tube 50 circumscribes cavity 56 and that slit 55 is elongated so as to extend axially of tube 50. When so pivoted, tube 50 is in an operating position 58, shown in FIGS. 2 and 3, in which slit 55 is disposed at boundary layer 17 and is aligned with opening 44. Tube 50 is pivotable from position 58 to an inactive position 59, shown in FIG. 4, in which slit 55 is disposed away from opening 44 and interiorly of skin 15.

Apparatus 10 is provided with any suitable mechanism for selectively pivoting tube 50 between positions 58 and 59 in response to signal 34. A representative such mechanism is shown in FIG. 2 and includes a sector gear 65, which is disposed circumferentially of tube 50 at the end thereof adjacent to lug 47, and a pivotal actuator 66 of any suitable construction mounted on lug 48 and receptive to signal 34. Actuator 66 has a toothed sector 67 engaging gear 65 so that, as indicated by arrows 68, movement of sector 67 in one direction pivots tube 50 toward position 59 and opposite movement pivots tube 50 toward position 58 from position 59.

When tube 50 is in operating position 58, air flowing in boundary layer 17 past slit 55 excites fluid pressure or acoustic oscillations in cavity 56. The diameter and length of tube 50 are dimensioned and proportioned so that, when missle 11 has a predetermined velocity in direction 16 and boundary layer 17 is in a state associated with such velocity, the oscillations have a predetermined frequency and so that, when missile 11 has a velocity in direction 16 less than the predetermined velocity, no oscillations are generated at the predetermined frequency. Apparatus 10 has an acousto-electrical transducer 70, best shown in FIG. 3, mounted on tube 50 for driving by acoustic oscillations therein to provide a signal 71 at the frequency of the oscillations. Transducer 70 is depicted in FIG. 2 as having a strip-like configuration commonly used with ceramic piezoelectric transducers; however, other configurations or other types of piezoelectric transducers may be used in practicing the subject invention so long as the transducer is adapted for mounting in juxtapositioned relation to cavity 56 to generate a signal 71 corresponding to acoustic oscillations therein. With such other configurations a suitable transducer may be mounted on one of the disks 52 or a plurality of transducers of the same or different configurations may be employed. Signal 71 is, typically, output from transducer 70 through a flexible conductor 72, shown in FIGS. 2 through 4, to accommodate movement of transducer 70 with tube 50 between the tube positions 58 and 59.

It will be apparent to one skilled in the art of slit tone oscillators that a number of modes of oscillations are excited in cavity 56 and that the particular mode may vary, as in a wind musical instrument, with air velocity over slit 55. However, the position of transducer 70 on tube 50 and the construction of the transducer may be such that the transducer is most receptive to oscillations having the frequency of a mode corresponding to the predetermined missile forward velocity of interest. Preferably, apparatus 10 is provided with any suitable band pass filter 75, shown in FIG. 2, and connected electrically between transducer 70 and logic 30. Filter 75 is tuned to pass such a frequency and thus generate signal 32 so that logic 30 only receives signal 32 when missile 11 attains said predetermined velocity and does not receive signal 32 when the missile has a velocity substantially less than said predetermined velocity.

OPERATION

The operation of the described embodiment of the subject invention is believed clearly apparent and will be breifly described.

During storage, tube 50 is kept in its inactive position 59, shown in FIG. 4, to prevent contamination or blockage of cavity 56. When a missile, such as 11, bearing an apparatus 10, is readied for operation, tube 50 may be pivoted to position 58 in any desired manner, for example manually on mounting the missile on an aircraft or by energizing actuator 66 from within the aircraft. Cavity 56 is, typically, configured so that the frequency of a mode of oscillation, which corresponds to a predetermined flight speed of the aircraft and is passed by filter 75, results in signal 32 to logic 30 that conditions are suitable for the arming of the missile. When the aircraft subsequently lands without releasing the missile, the lower landing speed does not produce oscillations at such frequency thereby signalling logic 30 to safe the missile without human intervention. Logic 30 can, of course, be arranged to signal actuator 66 to position tube 50 in its operating position 58 until signal 32 is generated and then signal actuator 66 to position the tube in its inactive position 59. After a missile, such as 11, attains a velocity at which signal 32 is generated, the missile may accelerate to a higher velocity such that a mode of oscillation occurs in cavity 56 at a frequency not passed by filter 75 or such that there is no oscillation. In such event logic 30 may be arranged to arm the missile when signal 32 is first generated and to resafe the missile when signal 32 is again generated as an aircraft bearing the missile slows for landing.

Obviously, many other variations and modifications of the present invention are possible in light of the above teachings. It is, therefore, to be understood that within the scope of the following claims the invention may be practiced otherwise than specifically described.

What is claimed is:

1. In combination, a missile having a skin and moveable through the air so as to induce air flow in a boundary layer along the skin;

a safe and arm device mounted in the missile and receptive to an electrical signal;

a transducer for generating such a signal when subjected to air pressure oscillations, and a fluid oscillator apparatus comprising:

means, which define a cavity adjacent to said skin and define a slit opening from the cavity through the skin into the boundary layer, for generating air pressure oscillation in said cavity due to air flow in said boundary layer past the slit; and means for mounting the transducer in juxtapositioned relation to said cavity for reception of said oscillations so that such a signal is generated by the transducer when said oscillations occur.

2. The combination of claim 1 wherein said means for generating air pressure oscillations comprises a cylindrical tube circumscribing said cavity and having said slit extending axially of the tube in one side thereof.

3. The combination of claim 2 wherein the fluid oscillator apparatus further comprises:

means mounting said tube for pivotal movement about the axis thereof, and means for pivoting said tube between an inactive position in which the slit is disposed interiorly of the skin and an operating position in which the slit is disposed at the boundary layer.

4. The combination of claim 1 wherein said cavity and said slit are dimensioned and proportioned so that said oscillations are generated when air flow in said boundary layer attains a predetermined state corresponding to a predetermined forward velocity of said missile and are not generated when the missile has a velocity less than said predetermined forward velocity.

5. The combination of claim 1 wherein said cavity and said slit are dimensioned and proportioned so that said oscillations have a predetermined frequency when the missile has a predetermined forward velocity and wherein the combination includes a band pass filter tuned to said predetermined frequency and connected electrically between the transducer and the safe and arm device so that said device receives such a signal when the missile attains said predetermined velocity and does not receive such a signal when the missile has a velocity substantially less than said predetermined velocity.

6. The combination of claim 1:

wherein the missile is elongated along a predetermined direction of movement through the air, the missile terminating forwardly in a guidance portion and terminating rearwardly in a motor portion; and wherein the fluid oscillator apparatus is disposed between said portions and said slit opens transversely of the missile.

7. A fluid oscillator excited by fluid flowing in a boundary layer in a predetermined direction along an exterior surface of an object, the oscillator comprising:

a housing mounted on the object, the housing bearing a peripheral surface, which is aligned with said exterior surface so that fluid from the boundary layer flows over said peripheral surface, and the housing defining an opening through said peripheral surface;

a cylindrical tube defining a slit extending axially of the tube in one side thereof;

means for mounting the tube in the housing with the axis of the tube extending transversely of said direction and generally parallel to said peripheral surface, said axis being spaced from said peripheral surface substantially the radius of the tube;

means mounting the tube for pivotal movement about said axis between an inactive position, in which the slit is disposed away from said opening, and an operating position, in which the slit is aligned with said opening so that fluid flowing in said boundary layer excites acoustic oscillations within the tube; and means for selectively pivoting the tube between said positions.

8. The oscillator of claim 7 further comprising means mounted on said housing for closing the opposite axial ends of the tube.

9. The oscillator of claim 7 wherein the diameter and the length of the tube are selected so that said oscillations have a predetermined frequency when said object has a predetermined velocity generally in said direction.

10. The oscillator of claim 7 further comprising acousto-electrical transducer means juxtapositioned to said tube for driving by said oscillations to provide an electrical signal corresponding thereto.

* * * * *